United States Patent [19]
Griffith

[11] Patent Number: 5,397,874
[45] Date of Patent: Mar. 14, 1995

[54] ELECTRIC AUTOMATIC TEMPERATURE CONTROL

[75] Inventor: Robert C. Griffith, Woodland Hills, Calif.

[73] Assignee: Edsyn, Inc., Van Nuys, Calif.

[21] Appl. No.: 749,659

[22] Filed: Aug. 26, 1991

[51] Int. Cl.[6] .............................................. H05B 1/02
[52] U.S. Cl. ..................................... 219/497; 219/501; 219/505; 219/492; 323/235; 323/319
[58] Field of Search ............... 219/497, 492, 494, 501, 219/505, 508; 323/235, 236, 319; 307/117

[56] References Cited

U.S. PATENT DOCUMENTS

| | | | |
|---|---|---|---|
| 3,584,291 | 6/1971 | Budniak et al. | 219/501 |
| 3,878,358 | 4/1975 | Barton et al. | 219/505 |
| 4,029,937 | 6/1977 | Russell | 219/501 |
| 4,086,466 | 4/1978 | Scharlack | 219/497 |
| 4,167,663 | 9/1979 | Granzow, Jr. et al. | 219/497 |
| 4,400,613 | 8/1983 | Popelish | 219/497 |
| 4,590,363 | 5/1986 | Bernard | 219/501 |
| 4,660,057 | 4/1987 | Watanabe et al. | |
| 4,897,527 | 1/1990 | Cripps et al. | 219/497 |
| 5,075,537 | 12/1991 | Lorenzen et al. | 219/501 |
| 5,111,026 | 5/1992 | Ma | 219/497 |

Primary Examiner—Mark H. Paschall
Attorney, Agent, or Firm—Daniel T. Anderson

[57] ABSTRACT

A temperature control circuit is disclosed utilizing automatically either the electric heating (or cooling) element or a separate sensor to measure the instantaneous temperature of the thermal load device. Either a pulsating dc or an ac electric power source may be used with the temperature sensing occurring at near-zero points of the source voltage waveform. The sensor forms one element of a Wheatstone bridge which when unbalanced by a value lower than a chosen reference value, causes a monostable oscillator to flip for at least several cycles of the source power. This turns on a power SCR to feed electric current to the thermal load to increase its temperature (and resistance) until the bridge is again balanced to reverse the state of the monostable oscillator and turn off the SCR. A simple, reliable two step, user friendly calibration circuit is provided for the temperature selecting component. For multiple channel applications the circuit need be reiterated only in part whereby major portions thereof remain common to the various channels and need not be duplicated, thereby minimizing manufacturing cost, component space, heat generation, and power consumption.

20 Claims, 2 Drawing Sheets

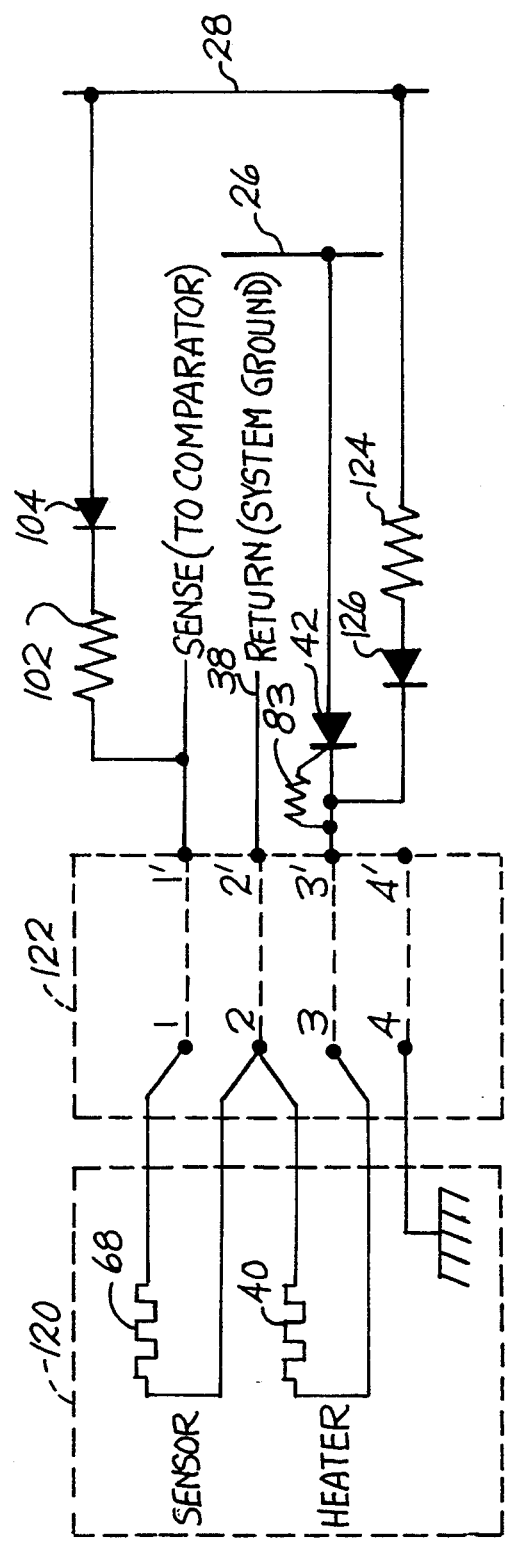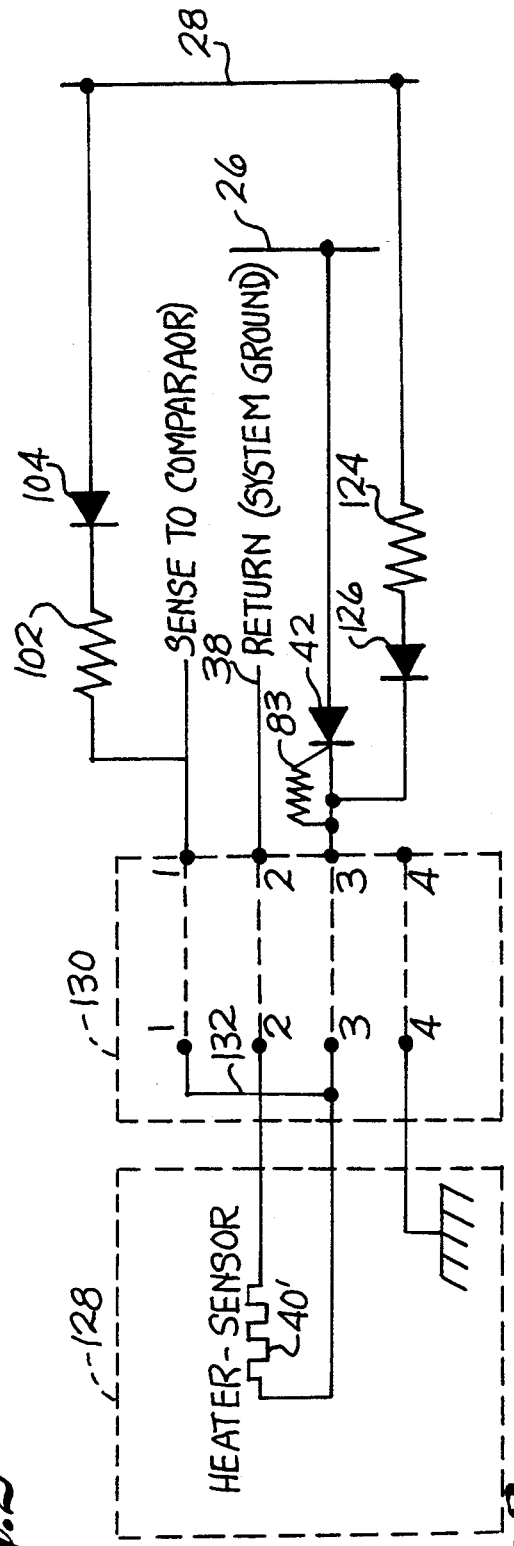

ELECTRIC AUTOMATIC TEMPERATURE CONTROL

BACKGROUND OF THE INVENTION

This invention relates generally to the field of electrical control of electrically energized thermal devices and more particularly to electronic control circuits which automatically, in a closed loop fashion, control electrical power to such devices by sensing their temperature and supplying electrical current as a function of that temperature.

Typical electrical thermal devices which may advantageously be automatically temperature controlled include processing or laboratory ovens or hot plates, fluid streams such as hot air for soldering, refrigerators whether mechanical or Peltier, and soldering-desoldering instruments; and, although for brevity and clarity, this specification focuses on the art of electric soldering tools, the electronic control circuitry described and claimed herein is totally applicable to the arts of other electro-thermal devices and systems such as those of the above examples.

An historically recent approach in controlling such devices has been to utilize the magnitude of the electrical resistance of the heating element, which varies substantially linearly with its temperature, as a measure of the temperature and use it in comparison with a set value to determine the amplitude of current to be supplied to the device for its heating or cooling. Utilizing the heater element's resistance is advantageous in many applications because it eliminates the need for a special sensor and its necessary connections; and it often senses the temperature quite precisely where most desired rather than in a somewhat remote location where the special sensor may have to be disposed.

A very clear presentation of the development of this approach is provided by a review of the following four United States patents:
  U.S. Pat. No. 3,524,968 THERMAL CONTROL FOR ELECTRICAL HEATING DEVICE by W. J. Walsh—1970
  U.S. Pat. No. 3,789,190 TEMPERATURE REGULATION FOR ELECTRICAL HEATER by D. J. Orosy and A. J. Matlen—1974
  U.S. Pat. No. 4,086,466 AUTOMATIC HEATER CONTROLLER by R. S. Scharlack—1978
  U.S. Pat. No. 4,507,546 CONTROL CIRCUIT RESPONSIVE TO A COMPONENT'S VARYING RESISTANCE by R. C. Griffith, W. S. Fortune, and W. A. Murray—1985

In this development there was a great increase in sophistication of approach and circuit execution, and full advantage was taken of the parallel development of circuit elements, components, integrated circuits and the like to make the controls more reliable, compact, stable, ragged, cheap, and easy to produce. They become efficient with time sharing techniques whereby the heater element could be "disconnected" from its power source as often as every cycle of an ac current source for a quick measure by another circuit, of its resistance while instantaneously being nonenergized. In the later stages of this development, when a resistance measure was to be taken, the power "disconnection" was accomplished at a near zero-crossing, or inflection point, of the ac or pulsed dc power wave thus, for example, to minimize rf noise generation and power consumption by the control circuitry. It may further be noted that this development has resulted in the ready availability of the worldwide market of a variety of highly successful control devices; and this is particularly true in the industrial-commercial area of hand held, automatically controlled soldering tools.

However, a very significant need exists for control circuits that are more efficient, versatile, reliable, and economic to produce and operate. For example, when supplying the international market, it is necessary to produce tools which can operate from 12 volts ac to 240 volts ac and from low dc voltage from battery packs and solar cells to high dc line voltage. And this versatility must be achieved in a manner to satisfy the requirements of a formidable number of national and state regulatory agencies who are concerned with matters such as personal and property safety as well as energy consumption. The costs of proving that a particular soldering tool satisfies all the requirements of all the agencies of a particular country are often so high that file manufacturer must decide on economic grounds that the tool cannot be offered in that country.

Current needs also include greater efficiency with respect to energy consumed to achieve the temperature control. It has also become important in a modern solder-desolder situation that two or more soldering tools are at hand for different purposes at different temperatures and tip shapes and wattages. Providing separate control with much common circuitry would minimize power consumption and parts cost.

A further need of high importance is to simplify the calibration of the control network with respect to having a closed loop system which holds the thermal device to any predetermined temperature (across a suitable working range) which the operator can readily set. Heretofore the calibration of such control systems has been a difficult, reiterative, time consuming and therefore costly and user unfriendly process.

Accordingly, it is an object of the present invention to provide an improvement in electronic temperature control circuitry for thereto electric devices which does not suffer the disadvantages and limitations of the prior art.

It is another object to provide such circuitry which is versatile with respect to input power voltage or character and versatile with respect to providing independently controlled channels for powering a plurality of thermo electric devices while using much common circuitry.

It is another object to provide such a control circuit which may be calibrated in a simple, reliable, two step adjustment so that an operator may thereafter directly set any selected temperature for each particular device.

It is another object to provide such a control circuit whereby a single basic circuit board may be mass produced and be used for any desired input voltage or for any number of independently controlled thereto electric devices.

It is another object to provide such control circuitry which is very low in its internal power consumption and which generates very little rf noise.

It is another and important object to provide such control circuitry in which the sensor may be a separate sensing heater element or a thermistor for applications wherein greater accuracy or tighter temperature control is desired and in which the control circuit automatically adapts to whichever type instrument it is connected to.

SUMMARY OF THE INVENTION

Briefly, these trod other objects are achieved in an example of the invention energized by sinusoidal ac or pulsed (or chopped) dc power and having a single channel for a single thermo electric device whose heating element is separate from the temperature sensor. The input power is conditioned by an input bridge rectifier to provide a full wave rectified, unfiltered dc voltage which is applied to the anode of a power SCR. A zero detector circuit processes a near zero window signal which controls a one shot multivibrator which in turn permits the SCR to be turned on or off only in the near zero window and, when mined on, to stay on for at least several half cycles of the input power thereby precluding a deleterious dc imbalance reflected into the power source. A temperature control bridge is provided in the combination and includes a sensing arm which incorporates the heater element and a reference which includes a temperature setting potentiometer with which the operator selects the operating temperature of the load drive. The reference arm also includes a simple two step calibration system which incorporates a low impedance output bias supply amplifier and achieves a non interdependence between the circuit parameters for calibrating the high and low ends of the temperature selection control.

The circuit contains another scaling resistor which is automatically brought into active role when a thermo electric device is plugged in which uses its own heater element as the temperature sensor resistance element. The additional scaling parameter compensates for the difference in resistance values of the heater-sensor unit versus the separate temperature sensing resistor. The additional scaling resistance is converted into the circuit by a novel plug attached to the thermo electric load device. The plug automatically connects the sensor resistor into the circuit when used and disconnects the additional scaling resistance which is used when a unitary heater sensor is used.

The invention also provides multiple channels making use of a common power supply and timing signals while permitting total independence of the channels otherwise.

DESCRIPTIVE LISTINGS OF DRAWINGS

FIG. 2 is a schematic diagram of a connector portion for one basic type of a thermo electric device controlled by the circuit of FIG. 1; and FIG. 3 is a schematic diagram like that of FIG. 2 shown in cooperation with a different type of thermo electric sensing device.

DETAILED DESCRIPTION OF A PREFERRED EMBODIMENT

Figure 1:
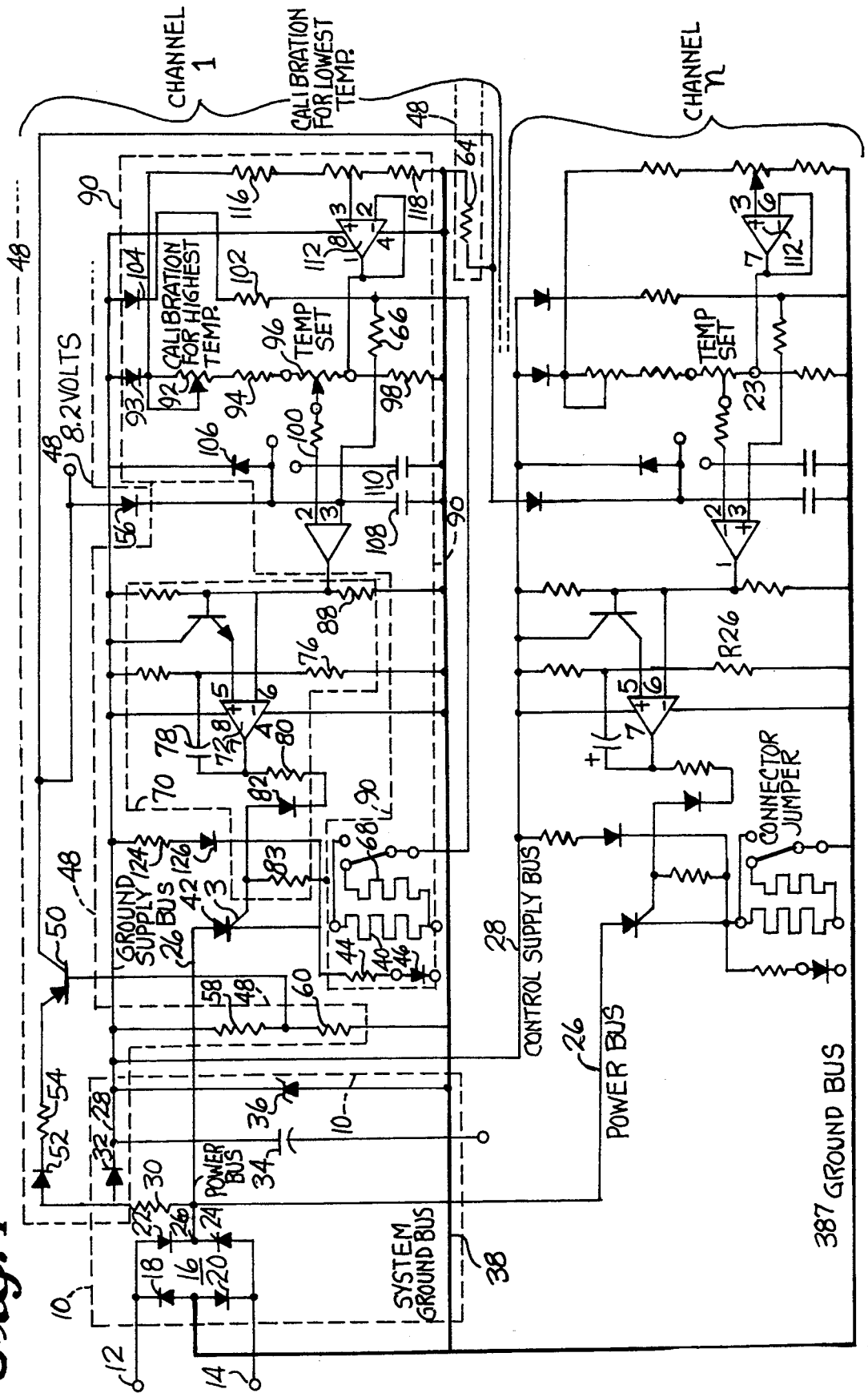
FIG. 1 is a schematic diagram of an example of an automatic temperature control circuit constructed in accordance with the principles of the present invention.

In this detailed discussion it may be useful to assume that the particular thermo electric device to be energized and controlled by the circuit is a hand held electric soldering instrument, although the circuit is equally useful in many other applications such as ovens, hot plates, Peltier heating or cooling devices, for example. In addition, one of the important advantages of the invention is that a plurality of different devices may be so operated totally independently of each other by including multiple channels in the circuit - one for each such device. The channels are essentially reiterative but have large, costly, power consumptive, heat generating common elements which are singular or not repeated: such non repeated elements include a timing circuit and the power supplies which 1) provide basic power to drive the thermo electric device and 2) a filtered, regulated voltage to operate the control circuitry.

In this detailed description, one channel, viz. Channel 1, is described and discussed in detail with tile understanding that additional channels, viz. Channel n, may be added as desired when more than one thermo electric device is to be operated.

In FIG. 1, then, an example of the basic Channel 1 is shown including the common power supply 10 which has a pair of input terminals 12, 14 upon which may be impressed in this example, a supply voltage of 24 volts 50–60 Hertz ac or pulsed dc as, for example, frown solar cells or a battery and then chopped. In either case a full wave bridge rectifier 16 comprising power diodes 18, 20, 22, 24 wired in the conventional manner provides a full wave rectified unfiltered 120 Hertz dc supply at its output terminal, power bus 26. The unfiltered nature of this dc supply provides a zero value at each cycle which is advantageous for the timing circuit, as discussed below, and permits the use of a very low control current, sensitive gate diode for handling the power to the thermo electric device. The four diodes of the bridge rectifier 16 may each be a 4 ampere, 100 volt diode such as a MDA970-2 by Motorola.

To provide a filtered voltage of 8.2 volts dc on the supply bus 28 for the control circuitry, current is drawn through a load resistor 30 and an isolating diode 32 to a filter capacitor 34 and a Zener diode 36. A common ground bus 38 is provided, as shown, for all system returns. The capacitor 34, in this example is a 2200 microfarad 16 volt aluminum axial capacitor and the Zener diode 36 is an 8.2 volt, 400 milliwatt IN756A. The load resistor 30 is a 220 ohm, 2 watt resistor in this 24 volt supplied example. When the supply voltage is 115 volts, the load resistor may be 3 kilohms; and when 240 volts is used, its value should be of the order of 6 kilohms.

Power to the thermo electric device, in this instance a soldering instrument heater 40, is supplied from the power bus 26 through a gated power SCR diode 42 which may be an SCR/thyristor rated at 4 amperes and 400 volts such as an MCR 106-6 by Motorola. The electrical parameters of the heater 40 in this example are 70 watts and 8 ohms. An illuminated indicator circuit showing instantaneously whether the heater 40 is energized is shown connected in parallel with it. The indicator circuit may consist of a 2400 ohm limiting resistor 44 and, in series, an appropriate light emitting diode 46.

The heater element 40 may also serve as its own temperature sensor, although not shown hooked-up in such mode in the figure. However, when the heater element is so configured in tile temperature sensing circuit, it is decoupled from the power bus 26 for a fraction of the input power cycle waveform when it is at and near zero value, the time of decoupling being of the order of 0.1 millisecond. The desired decoupling is achieved by gating tile SCR 42 off as its unfiltered dc input waveform on its anode approaches zero and gating it back on when the value is near zero. This technique minimizes 1) the generation of rf noise and 2) the amplitude of driving current to achieve tile SCR gating.

A near zero circuit 48 that derives a signal timed at the near zero value of the unfiltered voltage on the power bus 26 consists of a general purpose PNP transistor 50 which may be a Motorola 2N2907A, a computer diode 52 which may be a Motorola IN914, the 1 ampere 400 volt diode 32 such as a 1N4004, a diode 56 which may be another 1N914, a 1 kilohm ⅛ watt resistor 54, a 15 kilohm ⅛ watt resistor 58, a 10 kilohm ⅛ watt resistor 60, and a ⅛ watt 1000 ohm load resistor 64.

In operation, the near zero signed generator circuit 48 creates a condition whereby the power SCR 42 can be turned on or off only during a near zero window of tile unfiltered dc power on the bus 26. When the instantaneous voltage on the power bus 26 is below the filtered control supply bus 28 which is held at 8.2 volts by the Zener diode 36, the diode 32 does not conduct and its anode is accordingly isolated from the dc bus 28; and the diode 52 prevents the emitter of the transistor 50 from conducting in the reverse sense. When tile instantaneous amplitude of the bus 26 voltage rises above that at the base of tile transistor 50 plus about 1.2 volts (the base-emitter voltage drop added to tile drop across the diode 52), the transistor 50 conducts causing a voltage at its collector such that the diode 56 conducts and causes a current to flow through tile sensor side of tile temperature (resistance) measurement bridge, that is, through a bridge resistor 66 and a heating element sensor resistor 68 in a manner described below in connection with the temperature sensing bridge portion of the Channel 1 circuit. It is sufficient to note here that this causes an apparent over temperature effect and the circuit prevents the SCR 42 from turning on once the transistor 50 begins conducting. The bias voltage that controls the conduction of the transistor 50 is determined by the values, or ratio thereof, of the voltage divider resistors 58, 60. Typically, the voltage selected is 3 to 5 volts for input voltages in the 12 to 45 volts range and 8 volts for supplies of 120 or 240 volts. The amplitude chosen is determined by the threshold voltage of and the holding current required for the SCR 42. An additional factor is that when high input voltages are used, the slope of their waveform near zero is sufficiently steep that the desired 0.1 millisecond window would be deleteriously shortened. And this effect is compensated out by moving further along the waveform from the zero point thus necessitating a higher voltage at the window limits because of the steeper waveform slope in the near zero region.

With respect to the description of a one shot multivibrator circuit 70 it is desirable not only to gate control the SCR 42 at near zero points of its input, anode waveform but also, once turned on, to maintain it on for a number of cycles or preferably about a second so that it conducts for a minimum number of cycles. This avoids a condition where only one or a few odd half cycles of conduction would present an imbalance to the input power source. If, for example, it included a transformer, a dc bias could build up causing deleterious core saturation. This possibility is minimized by turning on the SCR 42 for at least 40 to 60 half cycles so that one odd cycle per mined on period would cause only an insignificant such dc imbalance. The circuit 70, accordingly, gates the SCR 42 on or off in its near zero window and holds it on for a preferred period of approximately a second which for a 60 Hertz power source represents 120 half cycles.

The circuit 70 includes an operational amplifier 72 the non inverting input 5 of which is connected to a voltage divider formed by a resistor 74, connected to the control supply bus 28, and a resistor 76 connected to the ground bus 38. The same midpoint of the voltage divider 74, 76 is coupled through a timing capacitor 78 to the output terminal 7 of the amplifier 72, the operational terminals 8, 4 of the amplifier being respectively connected to the supply bus 28 and ground 38. The output terminal 7 of the amplifier is fed to the gate electrode 3 of the SCR 42 through a resistor 80 and an isolating diode 82. A resistor 83 is connected, as shown, between the gate electrode 3 and the cathode of the SCR 42. The emitter of a transistor 84 is also connected to the non-inverting terminal 5 of the amplifier 72 and to the timing capacitor 78.

The inverting input 6 of the amplifier 72 and the base of the transistor 84 are connected to another voltage divider, bias generator formed by a resistor 86 connected to the supply bus 28 and a resistor 88 connected to ground 38. The collector of the transistor 84 is connected to the supply bus 28. The inverting input 6 of the amplifier 72 is also connected to the output of the comparator in the temperature sensing bridge as discussed below.

The operational amplifier 72 may be part of a linear integrated circuit which also includes a comparator circuit utilized in the temperature sensing circuit as discussed below. The integrated chip may be a LM 392N by Motorola. The transistor 84 may be a NPN high beta such as a 2N50889 by Motorola. The timing capacitor 78 in this example is a 4.7 microfarad 35 volt aluminum capacitor and the diode 82 is a 1 ampere 400 volt IN4004. The resistors 80, 83 are ⅛ wait 1000 ohms while the ⅛ watt voltage divider resistors 74, 86, 88 are each 330 kilohms and the resistor 76 is 100 kilohms also of ⅛ watt size. The resistors 74, 76 and 86, 88 form a bias network and their values are selected whereby the voltage, about 4.1 volts, at the inverting input terminal 6 of the operational amplifier is higher than the voltage, about 3.5 volts, at the non-inverting terminal 5 when the one shot multivibrator is in its stable state. The voltage at the non-inverting input 5 is held at 3.5 volts by the conduction of the transistor 84 which results in a low voltage at the output of the amplifier 72 and a stable, non charging or discharging voltage across the timing capacitor 78.

When a low temperature is sensed and the output of the comparator impressed upon the inverting terminal 6 of the amplifier 72 is low, the amplifier output is accordingly caused to be high; charging current then flows into the capacitor 78 causing the non-inverting input 5 to go more positive, about 9.5 volts, than the inverting input terminal. The output from the comparator then returns to high level, 4.1 volts, and causes the inverting input 6 to return to its previous level, 4.1 volts. However, because the non-inverting input 5 is still higher, 9.5 volts, than This condition continues until the timing capacitor 78 charges to a value where the voltage at the non-inverting input 5 to the amplifier 72 drops below the voltage at the inverting terminal; then the output of the amplifier is driven low and the low voltage at the non-inverting input 5 causes the transistor 84 to conduct heavily which rapidly discharges the capacitor 78. This fast discharge of the capacitor assures that the one shot multivibrator will be enabled for firing on the next cycle thus insuring continuous firing of the SCR 42 when full power to the heating element is required. Again, a low temperature sensing causes a low comparator output which causes the one shot monostable oscillator to flip causing in turn the firing of the SCR 42 to increase the temperature of the thermo electric device and thereby improve, or correct, the comparator output.

Referring to a temperature sensing circuit 90, it comprises basically a Wheatstone bridge having a reference side including a high temperature calibration potentiometer 92 connected between an isolating diode 93, whose anode is connected to the bus 28, and a resistor 94 connected to a temperature setting potentiometer 96 connected to a fixed resistor 98 connected in turn to ground 38. The diode 93 is a computer diode 1N914 by Motorola. The fixed resistors 94 and 98 are ⅛ watt 10 kilohms and 120 ohms respectively, while the potentiometers 92, 96 are linear controls of 20 kilohms and 1000 ohms respectively.

The adjustable tap of the potentiometer 96 is connected through a 10 kilohm resistor 100 to the inverting input terminal 2 of a comparator 72' the output 1 of which is connected, as stated above, to the inverting input 6 of the amplifier 72. The comparator 72' is, in this example, a portion of the integrated circuit chip which includes the operational amplifier 72; that is, it is a part of the microchip LM392N specified above. The other side of the bridge is the temperature sensing portion and includes a resistor 102 aid the healer sensor resistor 68. The ⅛ wait resistor 102 has a value of 12 kilohms while the heater sensor resistor 68 has a nominal value of approximately 100 ohms. The resistor 102 is connected to the supply bus 28 through an isolating diode 104 which may be another 1N4004. Similarly, the non-inverting input 3 of the comparator 72' is connected through a diode 106 to the bus 28.

A noise filter to minimize the occurrence or effects of rf or other high frequency disturbances is provided by shunting the high impedance resistors 66, 100 with low impedance capacitors 108, 110 which may have respective values of 1000 picofarads and 0.1 microfarad.

An integrated circuit operational amplifier 112 is connected to the bridge with its non-inverting input 3 connected to the adjustable tap of a low temperature calibration potentiometer 114 which is connected between a fixed resistor 116 connected in turn to the cathode of the diode 93 and a fixed resistor 118 connected to the ground bus 38. The operational amplifier terminals 8, 4 are connected respectively to the supply bus 28 and the ground bus 38. The output 1 of the amplifier 112 is connected to its inverting input terminal 2 to provide a unity gain amplification discussed below. The output of the amplifier 112 is also coupled to the reference side of tile bridge at the lower end of the temperature setting potentiometer 96.

The temperature sensing circuit 90 can be configured in different ways using different temperature sensors; for example, it may include the heater element itself or a separate resistance temperature sensor or two or more heater elements, with one of them serving tile dual role of sensing and heating, or a thermocouple temperature sensor. When the latter configuration is utilized, a thermocouple amplifier is constructed so that its output resembles a resistance temperature sensor. Such an amplifier may also be adapted to provide a direct digital readout of temperature.

In the example shown in FIG. 1, a separate resistance temperature sensor, resistor 68, is used and has the advantages of more accuracy particularly in a soldering instrument application: the sensing can be desirably more tightly thermally coupled to the soldering tip than can the heater element 40. For many practical applications, however, the simplicity, lower cost, red ruggedness of the unitary heater-sensor outweigh the greater precision and responsiveness of the separate resistor sensor.

In operation, it may be assumed that the input power is instantaneously near zero and that the transistor 50 is not conducting. In the Wheatstone bridge temperature is measured by comparing a set voltage at the temperature adjusting potentiometer wiper terminal in the reference side of the bridge (resistors 92, 94, 96, 98) to a voltage at the connection of resistors 102, 68 which make up the sensor side of the bridge. The comparison is amplified by the integrated circuit 72, 72' and used to control the circuits that apply power to the heater element 40.

The voltage from the reference side of the bridge is of course adjusted by setting the temperature potentiometer 96 to the desired temperature. The temperature range of the potentiometer is determined by the scale factor trimpot, potentiometer 92, and the bias voltage trimpot, potentiometer 114. The voltage at the full counter clockwise position or terminal of potentiometer 96 is set first to the lowest desired temperature of the heating element 40. This is accomplished in one simple step by holding the heater at its desired lowest temperature, e.g. 300° F. by adjusting the "lowest temperature" calibration potentiometer 114 to the stable condition of that temperature for the heater element 40. Then the temperature setting potentiometer is turned to its full clockwise position to its highest desired reading, e.g. 800° F. The scale factor trimpot potentiometer 92, the "highest temperature" calibration potentiometer, is then adjusted to a position which results in a stable temperature of the heating element 40 at 800°. The linear potentiometer 96 then provides accurate linear temperature control across its range of 300° to 800°.

The user friendly ease of this two step calibration is clue in pan to the non dependence of the lowest temperature setting of the temperature setting potentiometer 96 upon the value or setting of the voltage at its highest end by potentiometer 92, because of the low output impedance of the bias amplifier 112. With respect to the operation of amplifier 112 the resistors 116, 118 and the potentiometer 114 divide the control supply bus 28 voltage to provide an adjustable bias voltage at the wiper terminal of the potentiometer 114. The output, its terminal 1, is coupled to its inverting input 2 resulting in the unity gain amplifier, noted above, having a high input impedance and a low output impedance. With the wiper terminal of the potentiometer 114 connected to tile non-inverting input 3 of the amplifier 112, a low impedance bias voltage is provided at the output 1 which is connected to the counter clockwise terminal of the temperature setting potentiometer 96.

It may be noted that the diode 93 in the reference arm of the bridge compensates for the voltage drop across the diode 104 in the sensor arm; and the purpose of the diode 104 is to isolate the heater element 40 from the supply bus 28 when the heater is instantaneously energized -for applications wherein the heater is used as the sensor element. As the heater voltage increases to the voltage, 8.2 volts, of the bus 28 and above, the diode 104 reverse biases and provides the desired isolation. The diode 106 limits the voltage at the non-inverting input 2 of the comparator 72' when the SCR 42 is turned on and the input voltage exceeds the 8.2 volt bus 28: the resistor 66 limits the current through the diode 106.

The scaling and bias resistors 94, 116, 1 18 are selected in their values to match the sensor resistance value, their values being chosen to provide the desired range of scale factor and bias. A clip switch can advantageously be used to select scaling and bias resistances to accommodate the various sensor resistance values. And for simplicity the scaling and bias resistors may be in a binary sequence whereby a wide range of sensor resistances can be accommodated with a few preselected values.

When desired, the temperature setting function of the potentiometer 96 may be advantageously facilitated by utilizing a decade potentiometer of the character having a thumbwheel actuator. Once calibrated, as described above, the temperature of the heater can be value dialed on the thumbwheel resulting in a convenient, accurate, and low cost means of setting the desired operating temperature.

With reference to FIGS. 2 and 3, as discussed above, when a resistance change is used to sense temperature, either the heater or a separate resistor can be incorporated into the sensing portion of the bridge circuit. In the present invention either approach may be used and the circuit automatically adapts to whichever system is to be used. In soldering instrument applications this means that either a soldering iron having a unitary heater-sensor clement or a soldering iron having a heater element and a separate sensor may automatically be "plugged into" the circuit and put to immediate use without any separate switching, recalibrating, or the like. In accordance with the features of the disclosed circuit the only differences required for the two different types of soldering tools is that one jumper connection be made and that a separate scaling resistor be added in the sensor side of the bridge: these differences are automatically provided when the power plug for the particular soldering instrument is attached to the circuit.

In FIG. 2 a soldering instrument 120 is shown attached to the circuit of FIG. 1 by a standard 4 pin connector 122. The heater element 40 is connected to pin 3; the sensor resistor 68 is connected to pin 1; and their common ground is connected to pin 2. Pin 4 is the soldering instrument ground and may or may not be returned to the circuit ground 38: in the case shown, it is left as a floating ground.

Pin 1' on the circuit side is connected to the resistor 102 and thence through the diode 104 to the supply bus 28. The pin 2' is connected to the system ground bus 38; and the pin 3' is connected to the cathode of the SCR 42, with the resistor 83 in place between its gate electrode 3 and its cathode. In addition, the "new" scaling resistor 124 in series with its isolating diode 126 is shown connected to pin 3'. In this example the resistor 124 is a ½ watt 330 ohm resistor and the diode 126 may be another 1N4004.

It may be noted that when the soldering instrument 120 is plugged into the circuit as depicted in FIG. 2, the combination is exactly as shown in FIG. 1; and the resistor 124, with diode 126, is effectively inactive.

When, however, as shown in FIG. 3, a soldering instrument 128 of the character incorporating a unitary heater element - temperature sensor 40' is plugged into the FIG. 1 circuit, the new scaling resistor 124 is connected in parallel with the original scaling resistor 102 to provide in combination the appropriate value for the circuit as modified by unitary heater-sensor 40' instead of the sensor resistor 68.

In FIG. 3 then, the soldering instrument 128 is shown to include its plug 130 which includes a jumper 132 which connects pins 1 and 3 to cause the new scaling resistor 124 to be activated and in parallel with the other scaling resistor 102 in their return to the supply bus 28. Again pin 2 is grounded through pin 2' to the ground bus 38 and pin 4 is left as a floating ground for the hand held tool. Pin 3 of course is connected to pin 3' of the circuit which carries the power from the SCR 42 and connects to the new, or additional, scaling resistor 124. Again, it is emphasized that all other aspects of the system remain unchanged and either type of tool may be plugged into any channel of the circuit without concern for switching any connections or parameters.

With respect to the Channel n circuit shown in FIG. 1, it is noted again that as many such channels as desired may be utilized in the overall base circuit. The additional channels need only have their own SCR, one shot multivibrator, and temperature control bridge portions with common connections to the ground bus 38, the power bus 26, the control supply bus 28, and the near zero timing signal from the collector of the transistor 50. It may also be noted that in a presently preferred example the amplifier 112' of Channel n is the other part of the integrated circuit of the amplifier 112 of the Channel 1; that is, it is the other half of the linear dual operational amplifier c LM358N.

There has thus been disclosed and described an example of a multiple channel automatic temperature control circuit which achieves the objects and exhibits the advantages discussed herein above.

I claim:

1. Automatic temperature control and power switching circuit for a thermo-electric load comprising:

AC power means for energizing the thermo-electric load, said power source means for having an alternating current waveform that periodically crosses through zero voltage;

temperature control circuit means for sensing a temperature representing that of the thermo-electric load;

power switching means responsive to said temperature control circuit means for selectively connecting said power source means to the thermo-electric load for a predetermined minimum number of half cycle waveforms selected to minimize DC bias build up due to one or several odd half cycles of conduction of one polarity of said alternating current; and timing control circuit means connected to said power source means for preventing said switching means from operating unless said alternating current waveform of said power source means is below a predetermined amplitude.

2. The automatic temperature control and power switching circuit of claim 1, wherein said power switching means includes capacitive timed one shot multivibrator means for causing the connection of said power source means to said thermo-electric load for a minimum timed interval that corresponds to said predetermined minimum number of half cycle waveforms so as to minimize imbalance at said power source means, and said temperature control means having comparator means for causing connection of said power source means for a duration that depends on a load temperature sensed by said temperature control circuit means and said timing control circuit means.

3. The automatic temperature control and power switching circuit of claim 1, wherein said temperature control circuit means includes adjustable calibration means for independently setting a low temperature limit and a high temperature limit, and has user selection means for selecting an operating temperature within a range between said high and low temperature limits.

4. The automatic temperature control and power switching circuit of claim 1, further comprising at least a second switching means and a second temperature control circuit means for cooperating with a separate additional thermo-electric load;

said second switching means being responsive to said second temperature control circuit means for connecting said power source means to the additional thermo-electric load, and said second switching means and said second temperature control circuit means being responsive to said timing control means so as to prevent said second switching means from operating unless the waveform of said power source is below said predetermined amplitude, whereby at least a second control channel is provided for the separate additional thermo-electric load using said power source means and said timing control means in common with the first mentioned thermo-electric load.

5. The automatic temperature control and power switching circuit of claim 1, wherein the thermo-electric load may be of a type using the load resistance itself to sense a temperature representing that of the load, or of the type having a separate sensor resistance for sensing the temperature representing that of the load, and further comprising:

said temperature control circuit means including an auxiliary compensating resistance means; and an adaptor-connector means including jumper means for use with one of said types of thermo-electric load for connecting in circuit said auxiliary compensating resistance, whereby said compensating resistance cooperates in said temperature control circuit means for controlling the temperature representing that of the thermo-electric load depending on the type of thermoelectric load.

6. The automatic temperature control and power switching circuit of claim 1, wherein said timing control means comprises:

a control transistor circuit having one input connected to a regulated reference voltage and another input connected to said power source means, and having an output that disables said switching means from responding to said temperature control means when an amplitude of said waveform is above said regulated reference voltage.

7. The automatic temperature control and power switching circuit of claim 1, wherein the thermo-electric load is a device for melting solder.

8. The automatic temperature control and power switching circuit of claim 1, wherein said power switching means comprises a one-shot multivibrator means having a switch firing state triggered by said temperature control means and timing control circuit means, a timed capacitive charging state during which said power source means is connected to said thermo-electric load and a rapid discharge condition following said timed capacitive charging state for resetting said one-shot multivibrator means to enable it for refiring the next time it is triggered by said temperature control means and timing control circuit means.

9. Automatic temperature control and power switching circuit for a thermo-electric load, comprising;

power source means having an alternating current or pulsed DC waveform that periodically approaches zero voltage;

temperature control circuit means for sensing a temperature representing that of the thermo-electric load, said temperature control circuit means including means for independently setting high and low temperature range limits;

switching means responsive to said temperature control circuit means for selectively connecting said power source means to the thermo-electric load wherein the duration of such connection is controlled by said temperature control circuit means; and timing control means connected to said switching means for preventing said switching means from operating unless the waveform of said power source means is below a predetermined level.

10. The automatic temperature control and power switching circuit of claim 9, wherein said means for independently setting said high and low temperature range limits in said temperature control circuit means comprises an operational amplifier having an adjustable reference level at a low impedance output, and a user selected temperature setting potentiometer in a resistive bridge network, said low impedance operational amplifier output being connected to said bridge network adjacent said potentiometer to establish one of said temperature range limits.

11. The automatic temperature control and power switching circuit of claim 9, wherein said means in said temperature control circuit means for independently setting high and low temperature range limits comprises:

resistive bridge network means for comparing a resistance that varies with the temperature representing that of said load with a user adjustable potentiometer resistance to select a temperature setting;

low temperature calibration means including an operational amplifier having an adjustable input level and a low impedance output that is coupled to said resistive bridge network so as to establish a low temperature calibration reference level for said potentiometer; and high temperature limit calibration means including a variable resistance means connected in said bridge network for setting the high temperature range limit, whereby said operational amplifier output of said low temperature calibration means establishes a reference level at one end of said temperature setting potentiometer that remains independent of changes of the high temperature calibration means.

12. The automatic temperature control and power switching circuit of claim 11, further comprising an operational amplifier comparator having inputs connected to said resistive bridge network means and having an output that changes in a discrete voltage step when the temperature representing that of the load falls below the user selected temperature.

13. The automatic temperature control and power switching circuit of claim 11, wherein the thermo-electric load is a soldering device.

14. Automatic temperature control and power switching circuit for a plurality of thermo-electric loads comprising:

power source means for energizing the thermo-electric load, said power source means having an alternating current or pulsed DC waveform that periodically approaches zero voltage;

first and second temperature control circuit means for sensing temperatures respectively representing that of first and second thermo-electric loads;

first and second power switching means respectively responsive to said first and second temperature control circuit means for selectively connecting said power source means to the first and second thermo-electric loads; and timing control circuit means connected to said power source means for preventing said switching means from operating unless said waveform of said power source means is below a predetermined amplitude.

15. The automatic temperature control and power switching circuit of claim 14, wherein said plurality of thermo-electric loads are separate soldering devices.

16. Automatic temperature control and power switching circuit for a plurality of thermo-electric loads comprising:

common alternating current power source means for energizing the thermo-electric loads, said power source means having an alternating current waveform that periodically crosses through zero voltage;

first temperature control circuit means for sensing a temperature representing that of a first thermo-electric load, said temperature control circuit means including means for independently setting high and low calibration temperature limits;

first power switching means responsive to said first temperature control circuit means for selectively connecting said common alternating current power source means to a first thermo-electric load for a predetermined minimum number of half cycle waveform;

second temperature control circuit means for sensing a temperature representing that of a second thermo-electric load, said second temperature control circuit means including means for independently setting high and low calibration temperature limits;

second power switching means responsive to said second temperature control circuit means for selectively connecting said common alternating current power source means to a first thermo-electric load for a predetermined minimum number of half cycle waveform; and common timing control circuit means connected to said common alternating current power source means for preventing said first and second switching means from operating unless said waveform of said power source means is below a predetermined amplitude.

17. The automatic temperature control and power switching circuit of claim 15, wherein the thermo-electric loads are soldering devices.

18. The automatic temperature control and power switching circuit of claim 17, wherein the thermo-electric loads of the soldering devices may be either of a type using the load resistance itself to sense a temperature representing that of the device, or of the type having a separate sensor resistance for sensing the temperature representing that of the device, and further comprising:

at least one of said first and second said temperature control circuit means including an auxiliary compensating resistance means; and an adaptor-connector means including jumper means for use with one of said types of thermo-electric load soldering devices for connecting in circuit said auxiliary compensating resistance, whereby said compensating resistance cooperates in said one of said first and second temperature control circuit means for controlling the temperature representing that of the thermo-electric load depending on the type of thermo-electric load soldering device.

19. The automatic temperature control and power switching circuit of claim 16, wherein said common alternating current power source means comprises an unfiltered rectified AC supply and further comprising a filtering and regulating network means coupled to said unfiltered rectified AC supply for providing a DC control voltage supply.

20. The automatic temperature control and power switching circuit of claim 16, wherein said first and second power switching means each comprise a solid state switching device having a control lead coupled by circuit means to an output of said respective first and second temperature control circuit means.

* * * * *